United States Patent
Watanabe

(10) Patent No.: US 9,300,905 B2
(45) Date of Patent: Mar. 29, 2016

(54) PROJECTOR, PROJECTOR CONTROL METHOD, AND RECORDING MEDIUM STORING PROJECTOR CONTROL PROGRAM

(71) Applicant: Ayako Watanabe, Kanagawa (JP)

(72) Inventor: Ayako Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/323,187

(22) Filed: Jul. 3, 2014

(65) Prior Publication Data

US 2015/0015786 A1 Jan. 15, 2015

(30) Foreign Application Priority Data

Jul. 10, 2013 (JP) .................................. 2013-144434

(51) Int. Cl.
| | | |
|---|---|---|
| H04N 9/31 | (2006.01) | |
| H04N 5/91 | (2006.01) | |
| H04N 21/41 | (2011.01) | |
| H04N 21/485 | (2011.01) | |
| H04N 5/74 | (2006.01) | |

(52) U.S. Cl.
CPC ............... *H04N 5/91* (2013.01); *H04N 9/3155* (2013.01); *H04N 21/4122* (2013.01); *H04N 21/4854* (2013.01); *H04N 5/7416* (2013.01)

(58) Field of Classification Search
CPC ............ H04N 5/57; H04N 5/20; H04N 5/52; H04N 5/53
USPC .................. 348/671–689, 744–766; 345/102; 353/99, 30, 85
See application file for complete search history.

(56) References Cited

U.S. PATENT DOCUMENTS

| | | | |
|---|---|---|---|
| 7,400,314 B1 | 7/2008 | Agano | |
| 2003/0112378 A1* | 6/2003 | Okunuki et al. | 348/777 |
| 2004/0095358 A1 | 5/2004 | Takagi et al. | |
| 2004/0227456 A1* | 11/2004 | Matsui | 313/501 |
| 2005/0185149 A1* | 8/2005 | Lurkens et al. | 353/85 |
| 2006/0109281 A1* | 5/2006 | Kotani | 345/617 |
| 2006/0127081 A1* | 6/2006 | Lee et al. | 396/282 |
| 2006/0139245 A1* | 6/2006 | Sugiyama | 345/60 |
| 2007/0046829 A1 | 3/2007 | Su et al. | |
| 2008/0043031 A1* | 2/2008 | Jagmag | 345/581 |
| 2011/0128454 A1* | 6/2011 | Yasuda | 348/744 |
| 2012/0075353 A1* | 3/2012 | Dong et al. | 345/690 |
| 2013/0176494 A1 | 7/2013 | Takemoto et al. | |

FOREIGN PATENT DOCUMENTS

| | | |
|---|---|---|
| JP | 2002-156951 | 5/2002 |
| JP | 2013-140316 | 7/2013 |

OTHER PUBLICATIONS

Extended European Search Report dated Feb. 4, 2015 for corresponding European Application No. 14175462.

\* cited by examiner

*Primary Examiner* — Michael Lee
(74) *Attorney, Agent, or Firm* — Harness, Dickey & Pierce, P.L.C.

(57) ABSTRACT

A projector that maintains energy reduction while adjusting and controlling lamp power and projects an OSD screen with high visibility is provided. The projector includes a light source output adjustment unit that controls output of a light source according to brightness of a video signal, and a superimposed image projection unit that superimposes a predetermined superimposed image on a projection image generated according to the video signal. The superimposed image projection unit generates multiple images with identical content but at least partially different brightness and projects a different superimposed image depending on the projection image.

11 Claims, 12 Drawing Sheets

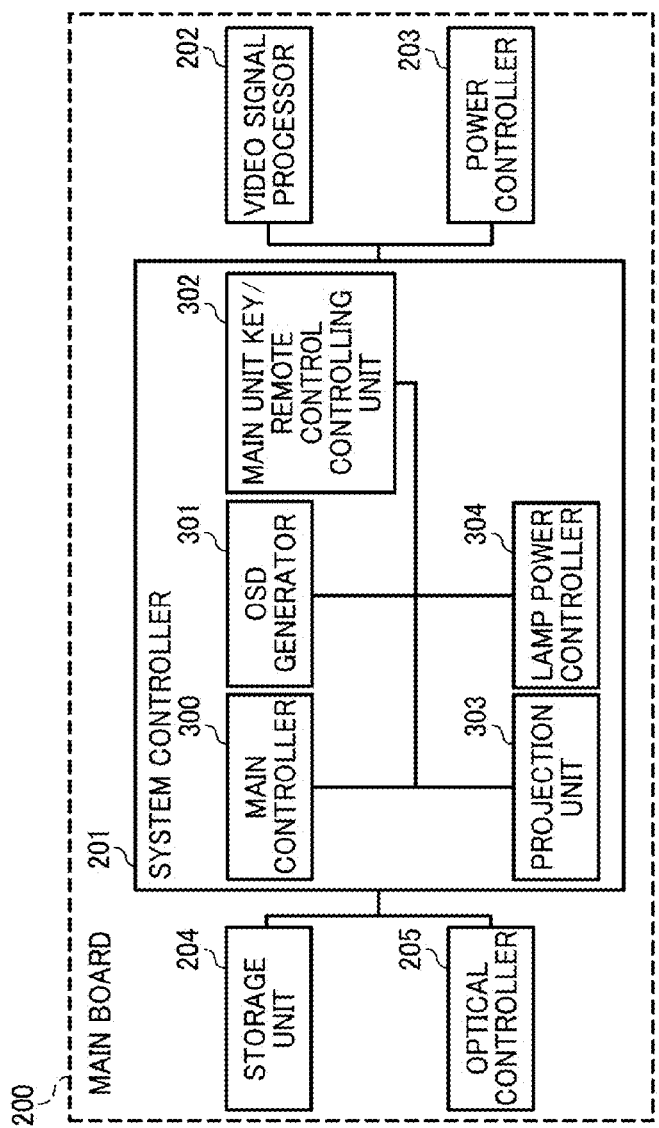

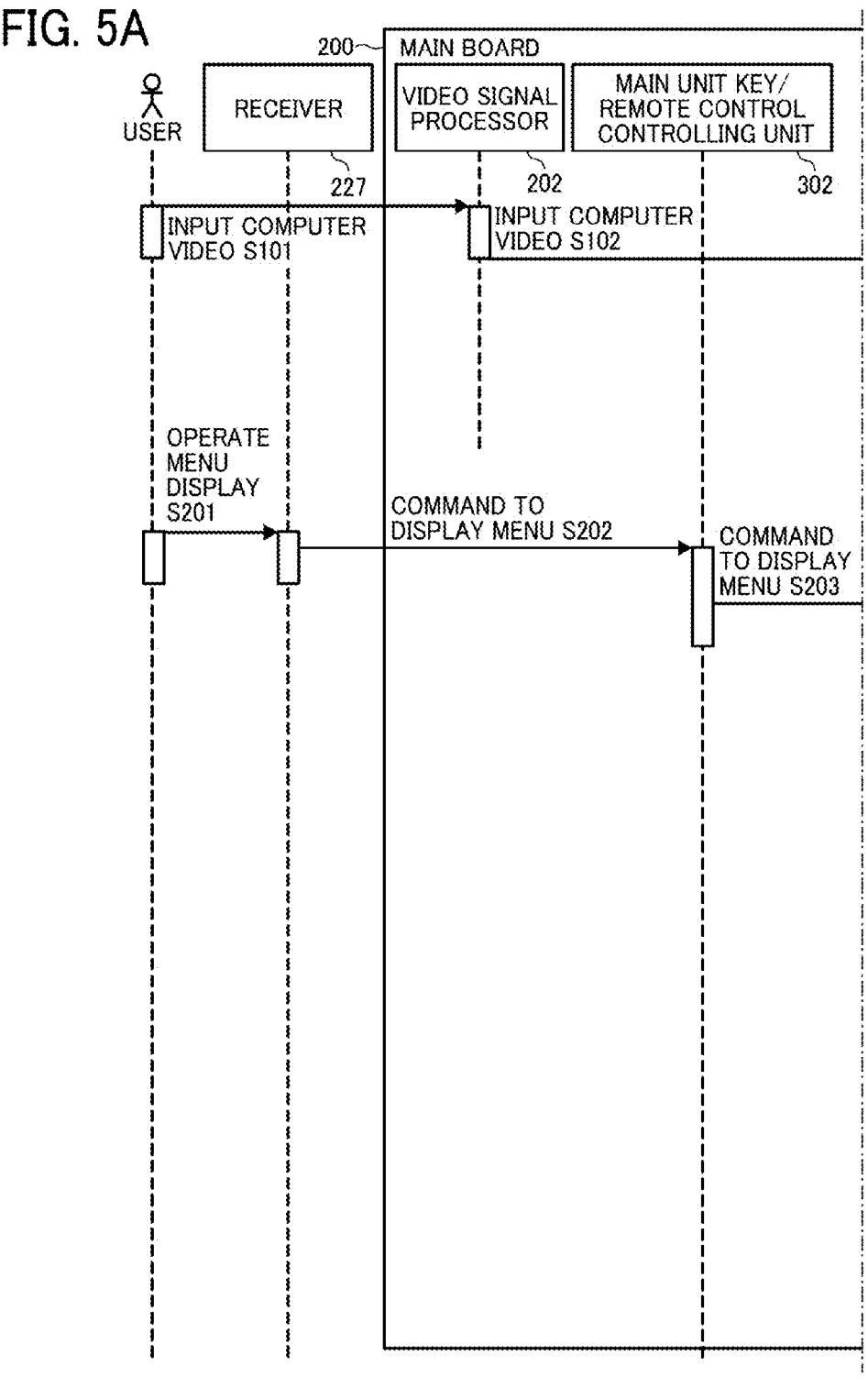

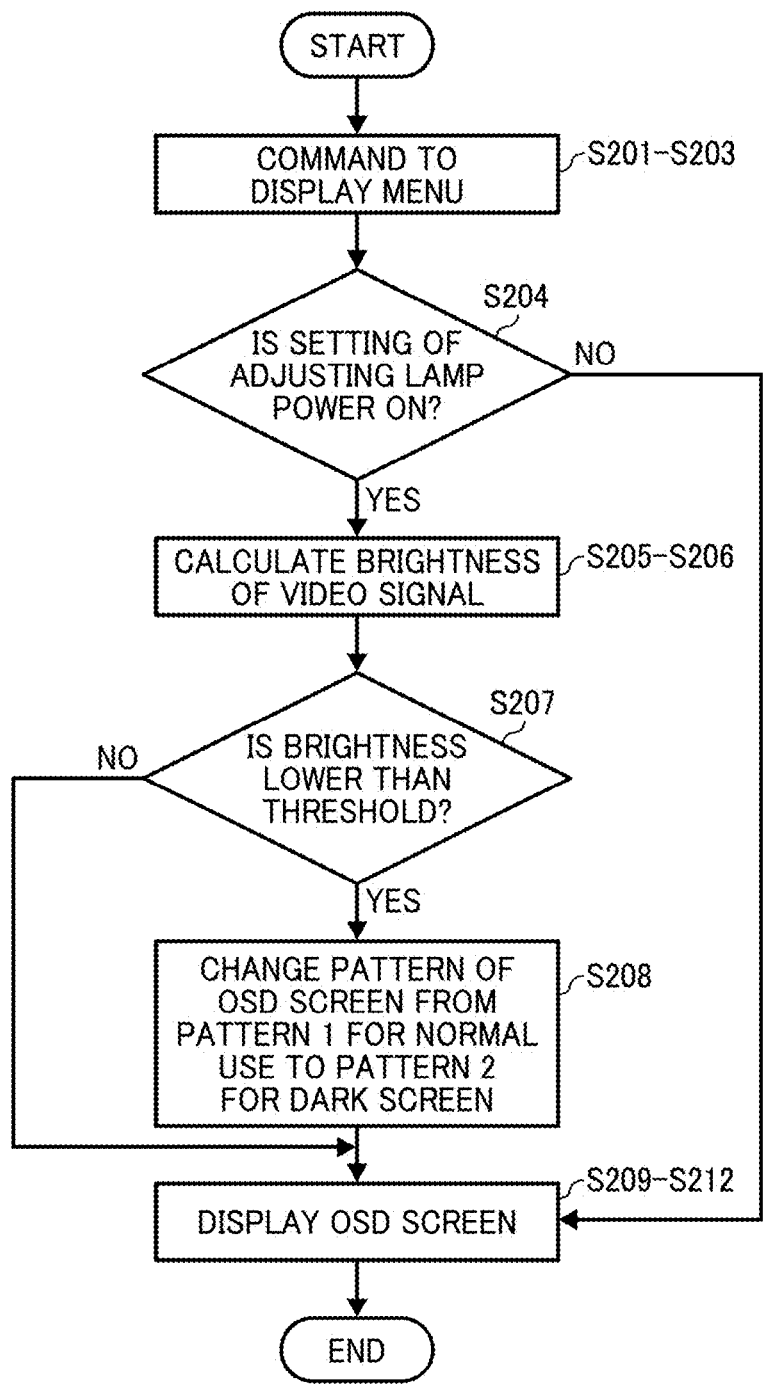

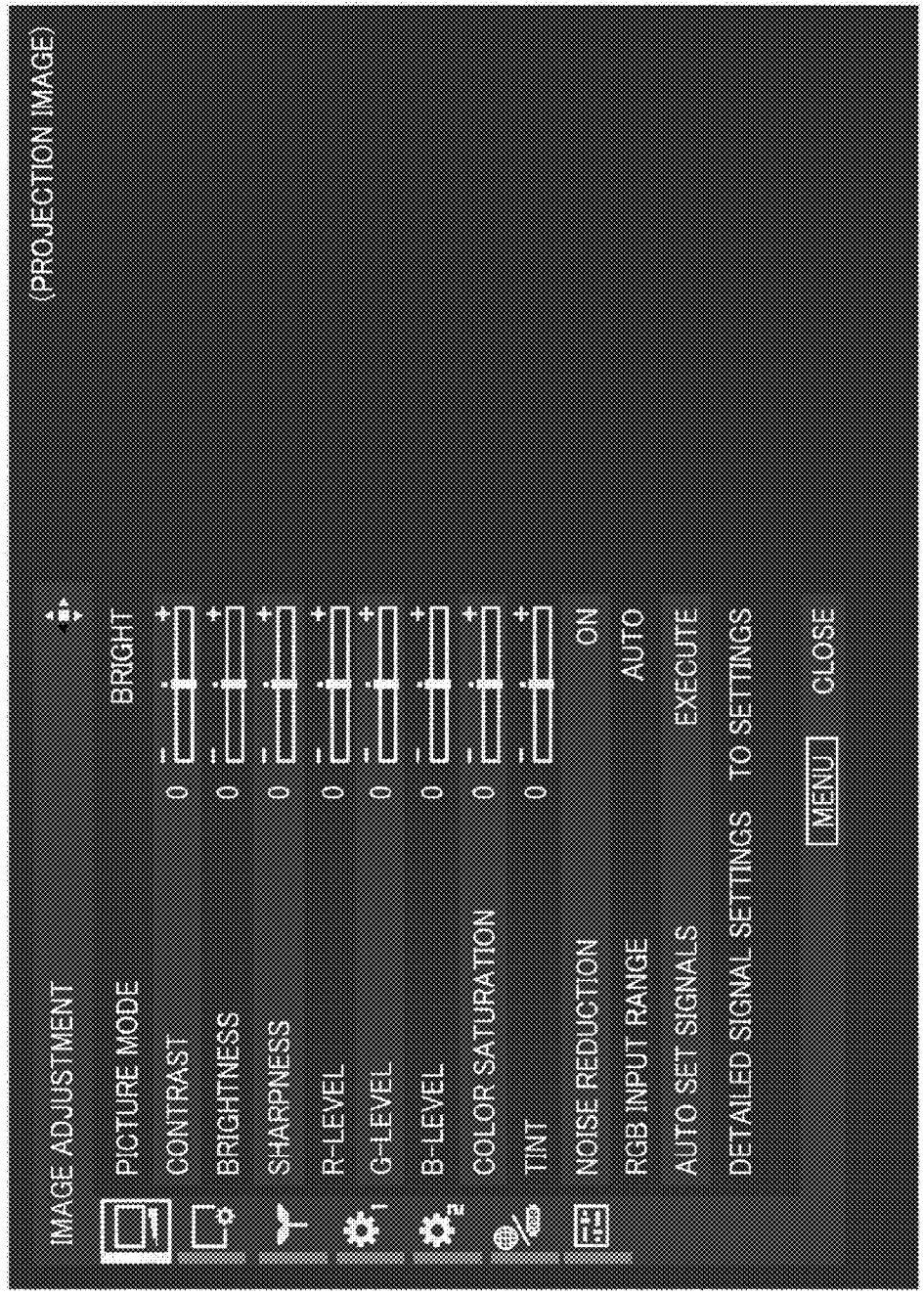

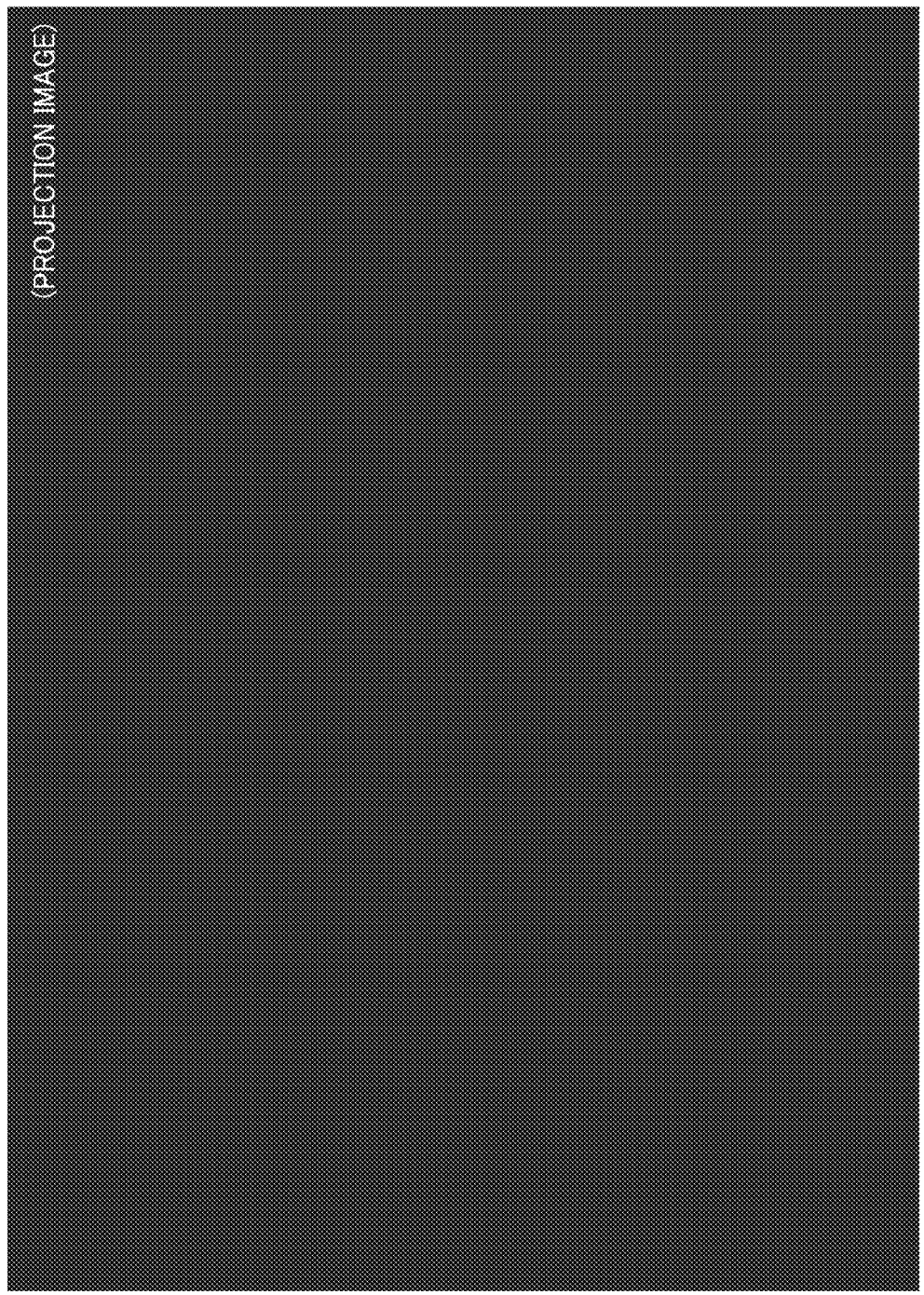

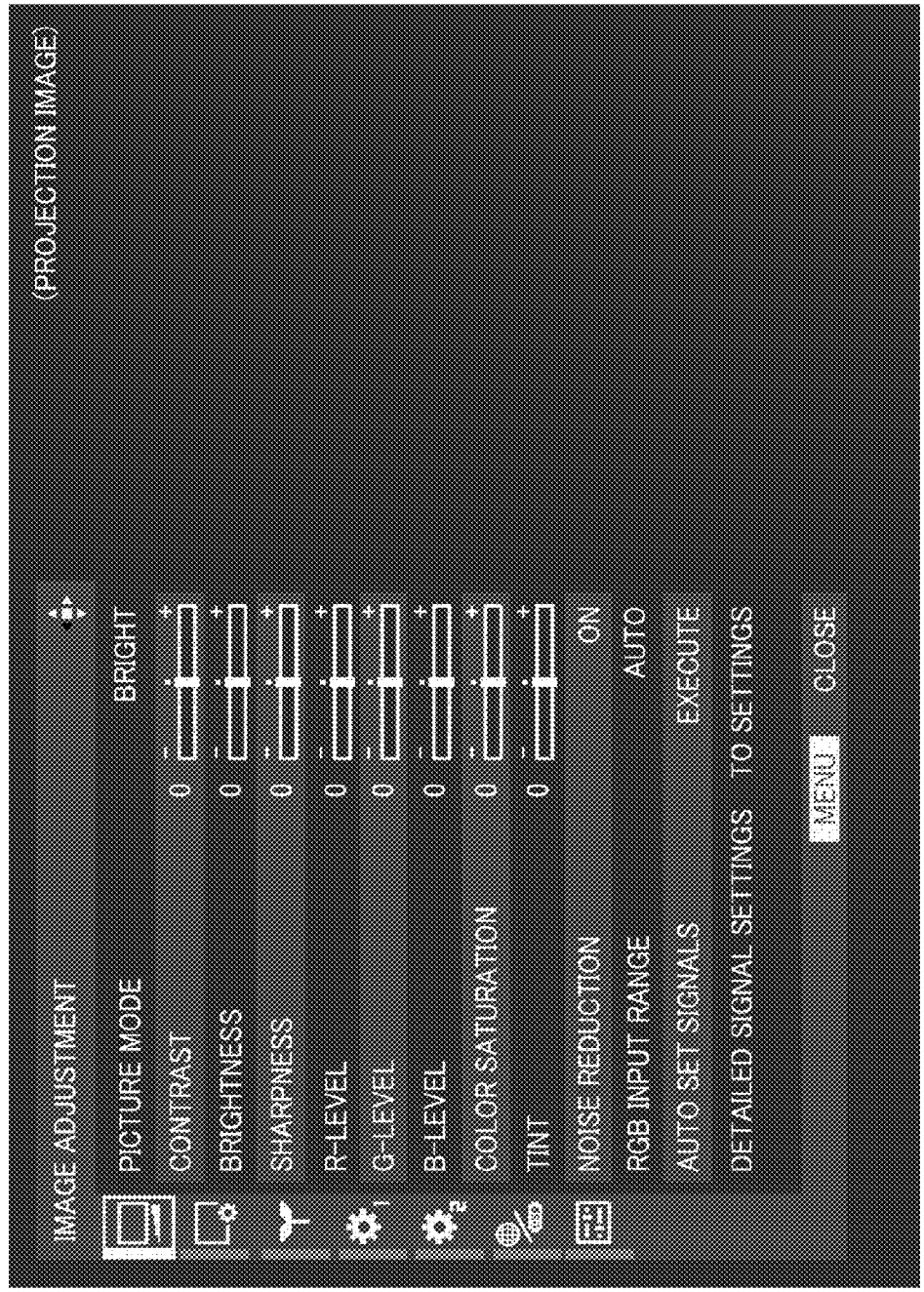

PROJECTOR, PROJECTOR CONTROL METHOD, AND RECORDING MEDIUM STORING PROJECTOR CONTROL PROGRAM

CROSS-REFERENCE TO RELATED APPLICATION

This patent application is based on and claims priority pursuant to 35 U.S.C. §119(a) to Japanese Patent Application No. 2013-144434, filed on Jul. 10, 2013 in the Japan Patent Office, the entire disclosure of which is hereby incorporated by reference herein.

BACKGROUND

1. Technical Field

The present invention relates to a projector, a projector control method, and a recording medium storing a projector control program.

2. Background Art

Recently, with projectors, their liquid crystal panels have become high-resolution, their brightness has been improved with high-efficiency lamps, and they have become less expensive. For example, compact and lightweight projectors that adopt a Digital Micro-mirror Device (DMD) have become popular, and those projectors have become widely used not only in workplaces and schools but also in homes. In particular, portability of front type projectors has been improved, and they have come to be used for especially small meetings with only several attendees.

Aside from images input from information processing apparatuses such as personal computers (PCs) connected to the projectors and which the projector projects on a screen, projectors also have an On Screen Display (OSD) function that projects a menu screen, etc., that enables various operations and settings input to the projectors.

On the menu screen displayed by the OSD function, various settings such as display language, display mode, image adjustment, and power management can be configured manually. In addition, error display screens, etc., are also displayed by the OSD function. Hereinafter, a menu or error screen, etc., which may be projected using the OSD function, is referred to as an OSD screen.

SUMMARY

An example embodiment of the present invention provides a projector that maintains energy reduction while adjusting and controlling lamp power and projects an OSD screen with high visibility. The projector includes a light source, a light source output adjustment unit that controls output of a light source according to brightness of a video signal input to the projector, and a superimposed image projection unit that superimposes a predetermined superimposed image on a projection image generated by the projector according to the video signal. The superimposed image projection unit generates multiple images with identical content but at least partially different brightness and projects a different superimposed image depending on the projection image.

Further example embodiments of the present invention provide a projector control method and a non-transitory recording medium storing a projector control program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 3 is a block diagram illustrating a configuration of a main board in the projector as an embodiment of the present invention.

FIG. 4 is a diagram illustrating a corresponding relationship between brightness of video and lamp power.

FIGS. 5A, 5B and 5C are sequence charts illustrating a process executed by the projector.

FIG. 6 is a flowchart illustrating a process executed by the projector.

FIG. 7B is a diagram illustrating a second screen pattern of the OSD screen.

FIG. 8 is a diagram illustrating a projection image.

FIG. 9 is a diagram illustrating the menu screen superimposed on the projection screen shown in FIG. 8 (with lamp power adjustment control in displaying the menu screen).

DETAILED DESCRIPTION

Figure 1:
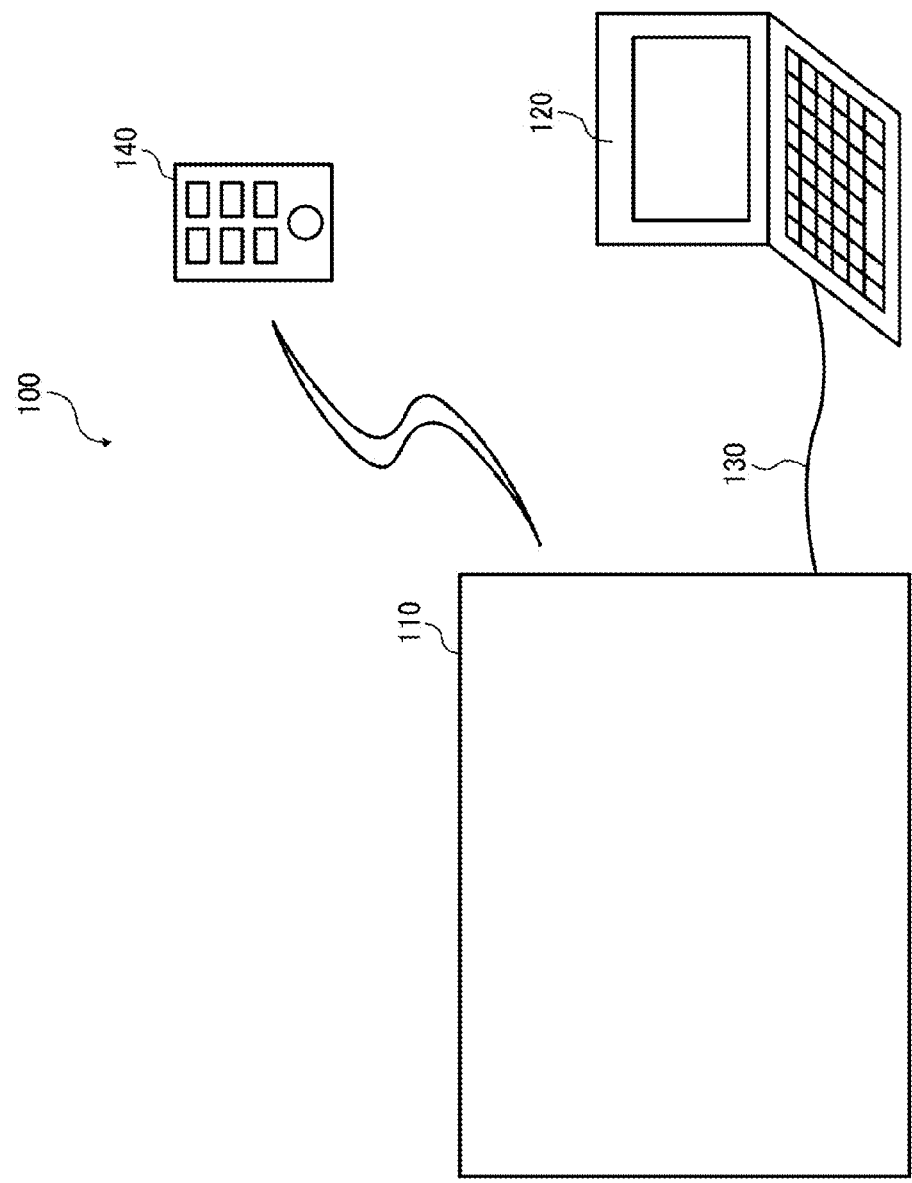
FIG. 1 is a schematic diagram illustrating an image projection system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the recent projectors, output of a light source (lamp power) may be controlled according to brightness (gradation) of a video signal, thus preventing dynamic range and image quality from deteriorating while achieving energy reduction, for example, as described in JP 2002-156951-A.

For example, output of the lamp may be modified according to the number of gradations of the input signal, so that the lamp power is boosted in the case of bright images and reduced in the case of dark images. For example, if a dark image is input to the projector, not only are dark colors displayed by the image display device (liquid crystal or DMD) but the output of the lamp is also reduced. By performing the process described above, it is possible to make the number of expressible gradations on the projection screen "the number of gradations expressible by the image display device" by "width of brightness expressible by the lamp".

In the projectors that boost the lamp power in the case of bright images and reduce the lamp power in the case of dark images (hereinafter referred to as "lamp power adjustment control"), in case of projecting the dark image (projection image) shown in FIG. 8, it is possible to keep the lamp power low by the lamp power adjustment control. However, from that status, if the menu screen prepared preliminary is displayed by the OSD function as shown in FIG. 9, since the brightness of the menu screen is configured as high, the lamp power is boosted by the lamp power adjustment control. By boosting the lamp power as described above, the energy-saving effect that the lamp power adjustment control aims to achieve originally is lost.

Figure 10:
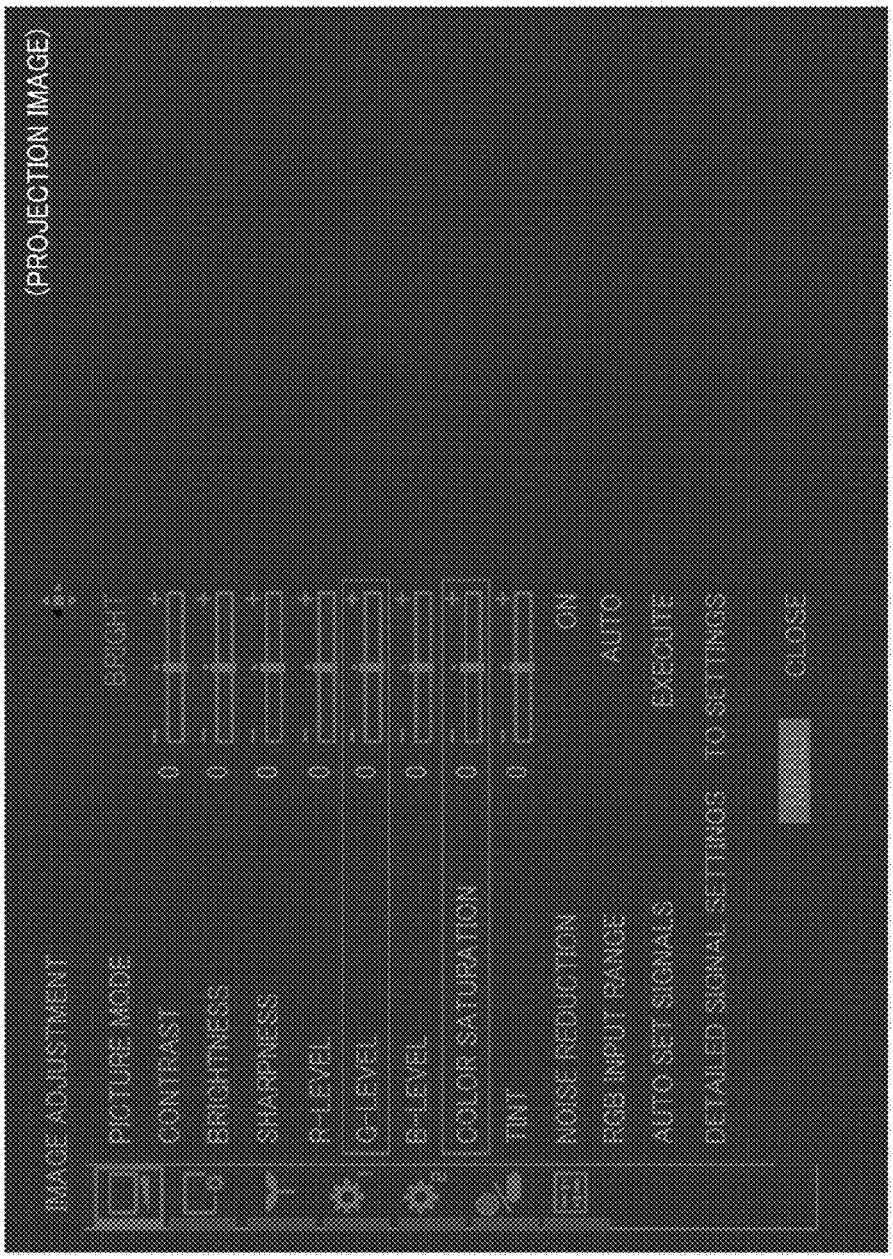
FIG. 10 is a diagram illustrating the menu screen superimposed on the projection screen shown in FIG. 8 (without lamp power adjustment control in displaying the menu screen).

In displaying the menu screen by the OSD function, it is possible to adjust and control the lamp power based on the brightness of the projection image before projecting the menu screen and keep the lamp power low by adjusting and controlling the lamp power. However, if the menu screen is displayed while the lamp power is kept low, the menu screen also gets dark as shown in FIG. 10, degrading the visibility of the menu screen.

In the following embodiment, a projector that can maintain the energy reduction of the lamp power adjustment control by controlling the displayed OSD screen selectively depending on the projection image and keeps projecting the OSD screen with high visibility is provided.

The projector 110 in this embodiment generates the projection image based on the video signal and projects the projection image on the projection surface. The projector 110 includes a light source output adjustment unit (lamp power controller 304) that controls output of the light source (lamp 221) according to brightness of the video signal and a superimposed image projection unit (OSD generator 301 and main controller 300) that superimposes a predetermined superimposed screen (OSD screen) on the generated projection image based on the video signal and projects the projection image. The superimposed image projection unit generates multiple images having identical content but at least partially different brightness (the first screen pattern and the second screen pattern in FIG. 7) and projects the different superimposed image depending on the projection image.

FIG. 1 is a schematic diagram illustrating an image projection system 100. The image projection system 100 includes a projector 110 and a video source apparatus 120, and the projector 110 is connected to the video source apparatus 120 via a cable 130.

The projector 110 projects an image provided by the video source apparatus 120 on a projection surface such as a screen etc. The projector 110 projects an OSD screen (superimposed screen) such as a menu screen configurable manually along with the image provided by the video source apparatus 120. It should be noted that the OSD screen can be projected even if the video source apparatus 120 does not provide images. In addition, the projector 110 receives operation requests from a remote control 140 and performs various operations that implements functions that the projector 110 includes.

The projector 110 includes video input ports such as a Video Graphics Array (VGA) input port, a High-Definition Multimedia Interface (HDMI) port, a S-Video port, and a RCA port as interfaces for inputting video signals and receives the video signal from the video source apparatus 120 via the cable 130 connected to those ports.

Alternatively, the projector can receive the video signal from the video source apparatus 120 using wireless communication in conformity with wireless communication protocols such as Bluetooth and Wi-Fi etc.

The video source apparatus 120 provides images that the projector 110 projects. The image providing apparatus 120 includes interfaces to output video signals and transfers the video signal that forms display images of the video source apparatus 120 to the projector 110 at a predetermined transfer rate (e.g., from 30 frame per second (fps) to 60 fps).

The video source apparatus 120 also includes video output ports such as a VGA output port, the HDMI port, the S-Video port, and the RCA port as interfaces for outputting video signals and transfers the video signal to the projector 110 via the cable 130 connected to those ports.

In addition, the video source apparatus 120 can transfer the video signal to the projector 110 using wireless communication.

For example, a notebook PC (information processing apparatus) can be used as the video source apparatus 120. In addition, the information processing apparatus that can provide the video signals such as a desktop PC, a tablet PC and a PDA can be adopted as the video source apparatus 120. In FIG. 1, while one video source apparatus 120 is connected to the projector 110, two or more video source apparatus 120 can be connected to the projector 110.

Figure 2:
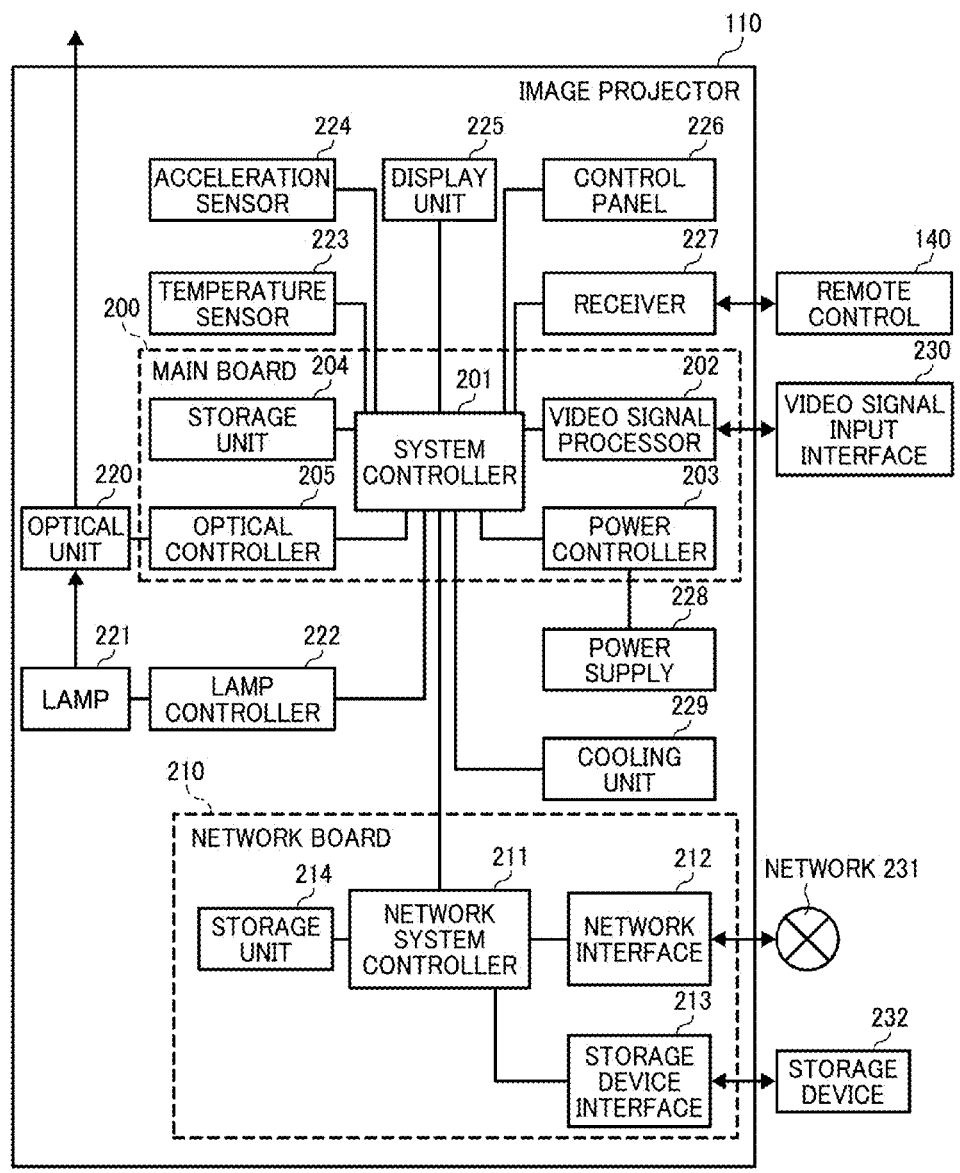
FIG. 2 is a block diagram illustrating a configuration of a projector as an embodiment of the present invention.

FIG. 2 is a block diagram illustrating a configuration of the projector 110 in this embodiment. The projector 110 includes a main board 200, a network board (expansion board) 210, an optical unit 220, a lamp (light source) 221, a power supply 228, and a video signal input interface 230.

The main board 200 is a printed-circuit board that controls the whole part of the projector 110. The main board 200 includes a system controller 201, a video signal processor 202, a power supply controller 203, a storage device 204, an optical controller 205 and can be configured using integrated circuits that implement the functional units described above such as Application Specific Integrated Circuit (ASIC) etc.

The system controller 201 controls the whole part of the projector 110. The system controller 201 is connected to the video signal processor 202, the power supply controller 203, the storage device 204, and the optical controller 205 via a bus and controls each of these functional units.

The video signal processor 202 processes the video signal that the video source apparatus 120 provides. The video processor 202 receives the video signal via the video signal input interface 230 and performs various processes such as serial-parallel conversion and voltage level conversion etc.

The power supply controller 203 controls the power supply 228 that supplies electric power to the projector 110. The power supply controller 203 turns on and off the power supply 228 under the control of the system controller 201.

The storage device 204 is nonvolatile memory that stores various data that the system controller 201 processes. Various nonvolatile semiconductor memory devices including EPROM, EEPROM, and flash memory can be adopted as the storage device 204.

The optical controller 205 controls the optical unit 220 that forms the video. The optical controller 205 supplies the image data that the system controller 201 generates to the optical unit 220 and forms the video of the image data. The optical unit 220 forms the video of the image data projects the image data on the projection surface by illuminating the optical unit 220 with the light generated by the lamp 221. If the projector 110 is a liquid crystal projector, it is possible to adopt a liquid crystal as the optical unit 220. If the projector 110 is a Digital Light Processing (DLP) projector, it is possible to adopt a DMD or a color wheel as the optical unit 220.

The lamp controller (light source controller) 222 controls the lamp 221 and adjust the amount of light of the lamp 221 under the control of the system controller 201. It is possible to use a high-pressure mercury vapor lamp etc. as the lamp 221.

The network board 210 is a printed-circuit board that controls network communication and an external storage device. The network board 210 includes a network system controller 211, a network interface 212, a storage device interface 213, and a storage unit 214, and the network board 210 can be configured by integrated circuits such as ASIC that implements the function.

The network system controller 211 controls communication via the network 231 and the storage device 232. The network system controller 211 is connected to the network interface 212, the storage device interface 213, and the storage unit 214 via a bus.

The network interface 212 communicates data via the network 231. The network interface 212 provides the data received from the network 231 to the network system controller 211 and sends the data received from the network system controller 211 to the network 231. The network interface 212 includes a port that can be connected to a network cable such as a LAN cable etc. and performs wired communication via the network cable. The network interface 212 also includes a wireless communication function such as Bluetooth and Wi-Fi and performs data communication by wireless communication.

The storage device interface 213 is an interface that connects to the portable storage device 232 such as a USB memory. The storage device interface 213 acquires image data such as an image and video and provides it to the network system controller 211.

The storage unit 214 is a nonvolatile memory that stores various data processed by the network system controller 211. In this embodiment, it is possible to adopt various nonvolatile semiconductor memory devices, such as EPROM, EEPROM, and flash memory, etc., as the storage unit 214.

In addition, the projector 110 includes a thermal sensor 223, an acceleration sensor, a display unit 225, an operational unit (main unit keys) 226, a receiver 227, and a cooling device 229, and these functional units are connected to the system controller 201 via a bus.

The thermal sensor 223 detects temperature of the projector 110. The thermal sensor 223 reports the detected temperature to the system controller 201.

The acceleration sensor 224 detects acceleration of the projector 110. The acceleration sensor 224 reports the detected temperature to the system controller 201

The display unit 225 displays various information, and the display unit 225 is comprised of a LED indicator and a liquid crystal panel. The display unit 225 displays information to be displayed received from the system controller 201 on the LED indicator and the liquid crystal panel.

The operational panel 226 accepts various operational requests manually and comprises key buttons (main unit keys) etc. laid out on the outside surface of the projector 110. The operational requests include a request to modify aspect ratio of the projected video, a request to turn off the projector 110, a request to change the lamp power to adjust the amount of light of the light source, a request to switch input that changes the image providing apparatus whose display image is to be projected if the multiple image providing apparatuses are connected, a request to change a video mode that changes quality of the projected video (e.g., bright, standard, and natural), a request to freeze that pauses the video to be projected, a request to change input type as type of port from which the image to be projected is acquired, a request to display the main menu screen or the sub-menu screen, a request to modify aspect ratio, and a request to close the sub-menu screen. After accepting the operational request, the operational unit 226 reports the operational request to the system controller 201.

The receiver 227 receives an operational signal from the remote control 140. After receiving the operational signal, the receiver 227 reports the operational signal to the system controller 201.

The cooling device 229 cools down the projector 110 and is comprised of components such as a cooling fan, etc. The cooling device 229 is driven under the control of the system controller 201 and cools down the projector 110.

FIG. 3 is a block diagram illustrating a configuration of the main board 200 included in the projector 110.

The system controller 201 includes a main controller 300, an OSD generator 301, a main unit key/remote control controlling unit 302, a projection unit 303, and a lamp power controller 304.

The main controller 300 controls the whole part of the system controller 201. The main controller 300 controls the system controller 201 and functional units described above.

The OSD generator 301 generates OSD screens such as a menu screen, dialog, message window, icon, and help that the main board 200 generates. The OSD generator 301 reads menu settings information displayed on the main menu screen from the storage device 204 and generates the main menu screen that reflects the menu settings information. The OSD generator 301 transfers a video signal that forms the main menu screen to the projection unit 303.

The main unit key/remote control controlling unit 302 accepts various operational requests from the operational unit 226 and the remote control 140 and reports the operational request that corresponds to each operational request.

The projection unit 303 projects image data by controlling the optical controller 205. The projection unit 303 transfers a video signal that forms an image received from the image providing apparatus 120, a video signal that forms the menu screen etc. acquired from the OSD generator 301, and a video signal that forms a sub-menu screen acquired from the network board 210 to the optical controller 205 and projects those image data.

If the projector 110 includes the network board 210, a network board interface that performs data communication between the main board 200 and the network board 210. The network board interface transfers a request to display the sub-menu screen and close the sub-menu screen to the network board 210 and receives a response signal to these requests and a video signal that forms the sub-menu screen from the network board 210.

The lamp power controller 304 adjusts appropriate output of the lamp according to brightness (gradation) of the video (video signal). For example, as shown in FIG. 4, the lamp power is set to 240 watts if brightness of the video is 100%, and the lamp power is reduced to minimum of 140 watts according to the brightness of the video. Here, the brightness of the video (gradation) means values of brightness or RGB.

The lamp power control by the lamp power controller 304 is referred to as lamp power adjustment setting, and it is preferable that whether or not this function is used (turning on/off the lamp power adjustment setting).

In adjusting the lamp power, it is preferable that the lamp power controller 304 adjusts the number of gradation of the video signal. That is, by increasing (decreasing) the number of gradation in response to darkness (brightness) due to lamp power control as optical correction, it is possible to save energy without changing the brightness of the output image (outlook brightness in viewpoint of a user).

Figure 5B:
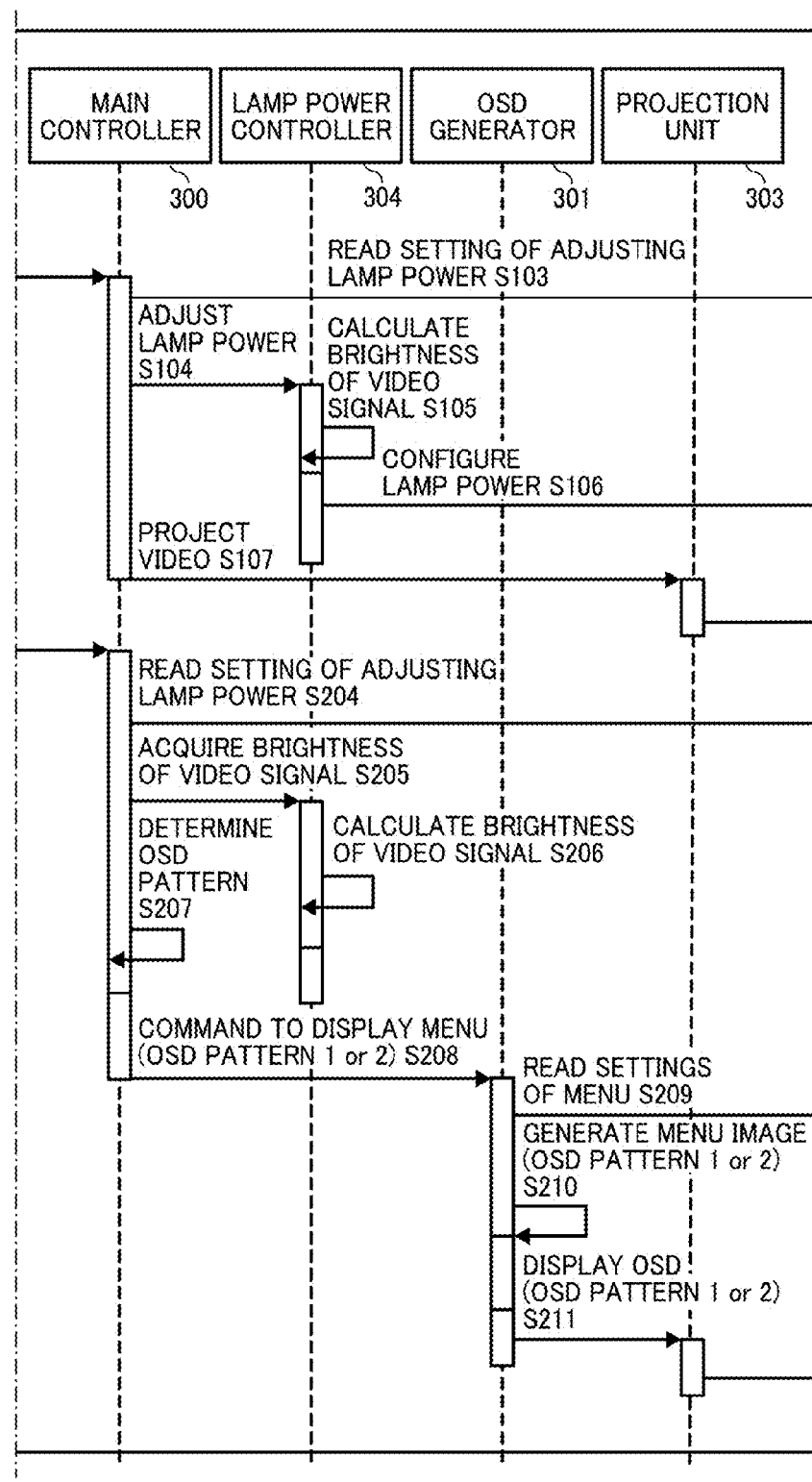
Figure 5C:
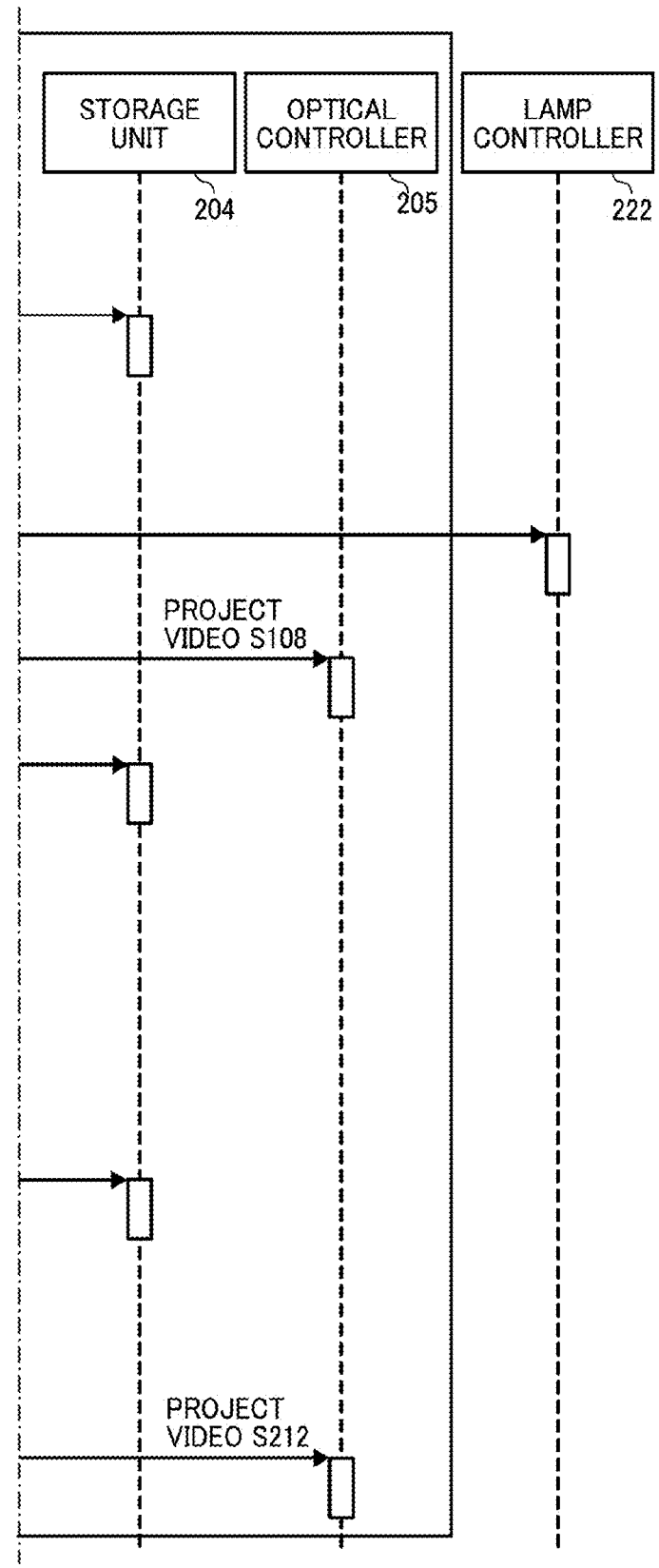

FIGS. 5A, 5B and 5C are sequence charts illustrating a process executed by the projector. FIG. 6 is a flowchart illustrating steps from S201 to S212 shown in FIG. 5.

How the video provided by the video source apparatus 120 is input into the projector 110 and is projected is described below. First, the image providing apparatus 120 is connected to the projector 110 via a cable (D-SUB cable) 130, the image providing apparatus 120 outputs a predetermined video, and the video signal processor 202 receives the video signal from the video source apparatus 120 in S101 (inputting computer video).

After detecting that the video signal processor 202 receives the video signal in S102 (inputting computer video), the main controller 300 reads that the lamp power adjustment setting is either on or off from the storage device 204 in S103 (reading the lamp power adjustment setting).

If the lamp power adjustment setting is on, the main controller 300 instructs the lamp power controller 304 to control the lamp power adjustment in S104 (performing lamp power adjustment).

After receiving the instruction from the main controller 300, the lamp power controller 304 determines the brightness of the video signal from the brightness histogram of the video and calculates the corresponding lamp power (watts as a percentage of watts at full power).

Next, the lamp power controller 304 sends the calculated lamp power (%) to the lamp controller 222 in S106 (setting lamp power). Subsequently, the lamp controller 222 controls the lamp 221 according to the calculated lamp power (%).

Next, the main controller 300 instructs the projection unit 303 to project the video in S107 (projecting video), and the projection unit 303 transfers the video signal from the video source apparatus 120 to the optical controller 205. Subsequently, the optical controller 205 projects the video signal in S108 (projecting video).

Next, how the OSD screen (e.g., a menu screen) is displayed after projecting the video from the video source apparatus 120 is described below. First, the menu is displayed by pressing the menu button on the remote control 140 or the operational unit 226 manually in S201 (operation to display the menu).

Next, the receiver 227 transfers content of the operation to the main unit key/remote control controlling unit 302 in S202 (instructing to display the menu), and the main unit key/remote control controlling unit 302 transfers the instruction to display the menu to the main controller 300 in S203 (instructing to display the menu).

The main controller 300 reads that the lamp power adjustment setting is either on or off from the storage device 204 in S204 (reading setting of lamp power adjustment).

If the lamp power adjustment setting is on, the main controller 300 acquires brightness of the video signal from the lamp power controller 304 in S205 (acquiring brightness of the video signal). For example, the brightness of the video signal can be determined from the brightness histogram of the video. However, this is just an example, and the brightness of the video signal can also be determined from RGB values of the screen.

The lamp power controller 304 determines the brightness of the video signal in S206 (calculating the brightness of the video signal). The video signal as the basis of this determination is input from the video source apparatus 120 before displaying the OSD screen.

After determining whether or not the brightness of the video signal is equal to or less than a predetermined threshold value, the main controller 300 determines which display pattern of the OSD screen is to be displayed, a first screen pattern (pattern 1) or a second screen pattern (pattern 2) in S207 (determining OSD pattern).

In this embodiment, two screen parts, the first screen pattern normally used and the second screen pattern used for dark screens, are preliminary prepared as display patterns for the OSD screen, and they are chosen based on the brightness of the video signal. Here, "the normal case" means that the brightness of the video signal is equal to or larger than the predetermined value or the lamp power adjustment setting is off (the case in which the OSD screen is not selected according to the projected image).

Next, the main controller 300 instructs the OSD generator 301 to display the menu using the selected OSD screen along with information on which OSD screen pattern is selected in S208 (instructing to display the menu).

Depending on the designated OSD screen pattern, the OSD generator 301 reads the menu setting from the storage device 204 in S209 (reading the menu setting) and generates the menu image in S210 (reading the menu setting).

Next, the OSD generator 301 transfers the menu image to the projection unit 303 in S211 (displaying the OSD). The projection unit 303 transfers the video signal for the menu image to the optical controller 205, and the optical controller 205 projects the video signal in S212 (projecting the video). By performing the control described above, it is possible to project the OSD screen selected according to the brightness of the video on the projection surface where the video from the video source apparatus 120 is projected.

As described above, how the menu screen is displayed based on the instruction manually is described with reference to FIG. 5 and FIG. 6. Regarding the OSD screens other than the menu screen such as displaying an error dialog due to error occurrence, one display pattern is projected among multiple patterns of error dialog display by performing steps after S204 by the main controller 300 that received the instruction to display error screen.

Patterns of menu images that the OSD generator 301 generates depending on the projection image represent not different display content but same information. By making brightness in a part at least different, it is possible to keep visibility of those images high without raising the lamp power even in controlling the lamp power.

In this embodiment, there are two patterns of the menu screen that the OSD generator 301 generates, the first screen pattern normally used and the second screen pattern. However, the number of patterns of the OSD screen is not limited to two, and it is possible to use more than three screen patterns. In this case, it is preferable to configure multiple threshold values to determine according to the number of patterns.

Figure 7A:
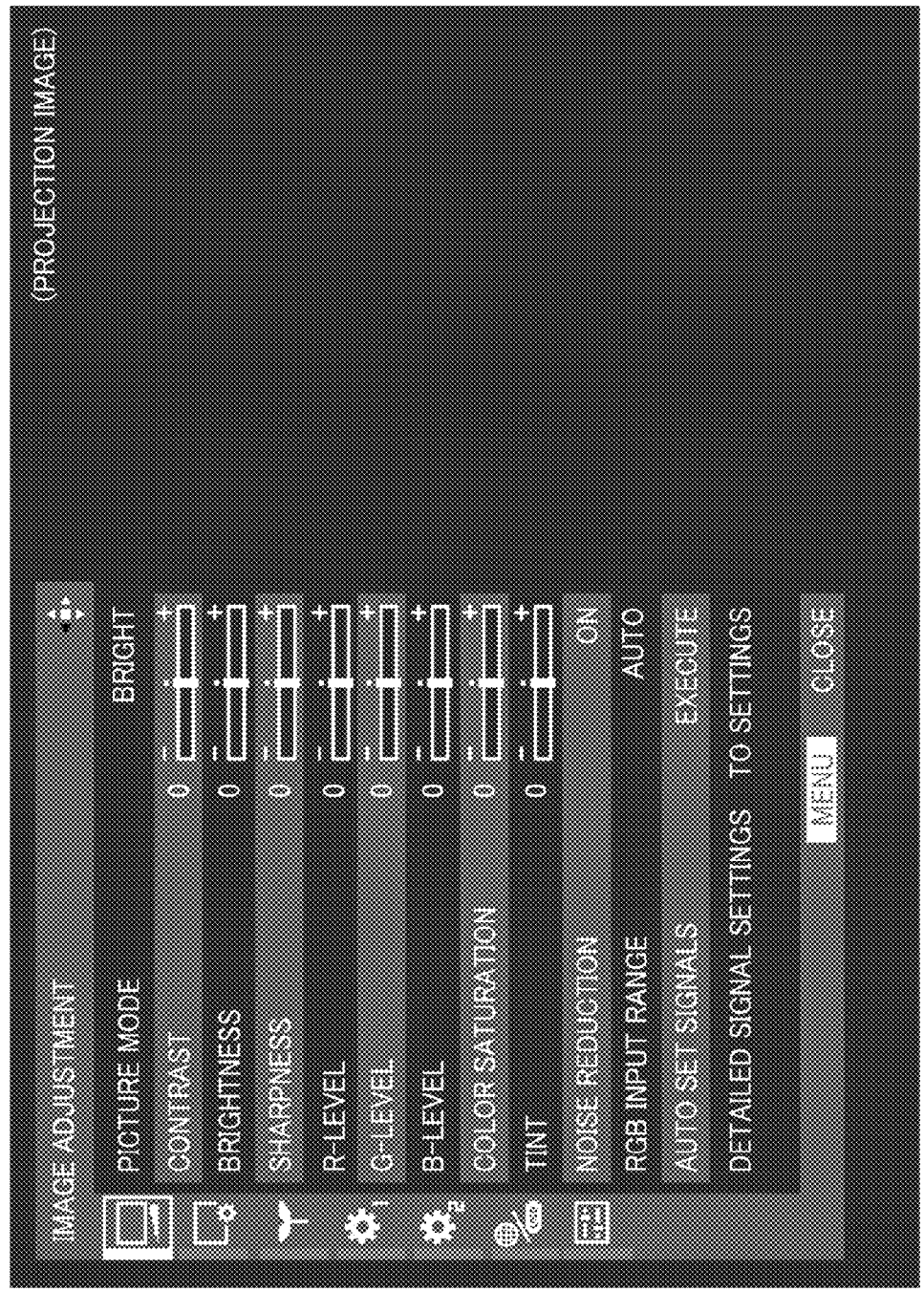
FIG. 7A is a diagram illustrating a first screen pattern of the OSD screen.

The OSD generator 301 generates the first screen pattern normally used and the second screen pattern used under the predetermined condition. FIG. 7A is a diagram illustrating the first screen pattern of the OSD screen normally used, and FIG. 7B is a diagram illustrating the second screen pattern of the OSD screen used for the dark screen.

In the screen patterns shown in FIGS. 7A and 7B, in the second screen pattern, background part of the screen pattern (parts except for characters, cursor, and icon) is darker than the first screen pattern. In addition, in the second screen pattern, contrast ratio between the background part and text part including cursor and icon is larger than the first screen pattern. That is, in the second screen pattern, its contrast becomes larger than the first screen pattern by making brightness of texts less dark compared to making the brightness of the background part darker. In FIG. 7, texts in the second screen pattern are darker than the first screen pattern. However, it is not limited to that example, and it is possible to make the brightness of text parts same in both two patterns.

By adopting the configuration described above, the second screen pattern is dark image in whole. It is possible to prevent the lamp power from becoming large when the lamp power controller 304 controls the lamp power in S106 and keep visibility of the screen by maintaining the predetermined contrast.

As shown in FIG. 7A, in the first screen pattern, background parts of strings such as "CONTRAST" and "SHARPNESS" look brighter than background parts of strings such as "BRIGHTNESS" and "R-LEVEL", and the background parts corresponding to the strings have striped different brightness alternately. By contrast, as shown in FIG. 7B, in the second screen pattern, the background parts of each string look uniformly dark. Consequently, it is possible to prevent the lamp power from becoming large when the lamp power controller 304 controls the lamp power in S106.

Examples of the different screen patterns are not limited to the above description. For example, settings on font and text size of text parts are different between the first screen pattern and the second screen pattern, and in the second screen pattern, it is possible to prevent the lamp power from becoming large when the lamp power controller 304 controls the lamp power in S106.

In this embodiment, the first screen pattern is used by default, and the OSD is displayed after changing into the second screen pattern if the brightness of the video signal is equal to or less than a predetermined threshold value. In this case, it is possible to change into the second screen pattern if the brightness of 90% of the pixels is equal to or less than 30/255 for example. Since different types of lamp have different brightness and the visibility of the OSD screen is different, it is possible to check the projection screen in designing the projector and configure the optimal value.

In the embodiment described above, the main controller 300 selects the screen pattern of the OSD screen based on the brightness of the video (the number of gradations of brightness and RGB values). However, it is possible to configure the threshold value of the lamp power using the lamp power (%) that the lamp power controller 304 calculates from the brightness of the video as criteria. Alternatively, it is possible to select the screen pattern of the OSD screen using both the brightness of the video and the lamp power as criteria.

In the above description, the OSD generator 301 stores the predetermined number of screen patterns preliminarily. Other than that, it is possible to calculate optimal brightness values of backgrounds and texts in the screen pattern. For example, it is possible to calculate the brightness of the background and text parts of the OSD screen according to average value of brightness of the detected video signal etc. and project the video. Consequently, it is possible to display the OSD screen with appropriate brightness according to the brightness of the video signal.

As described above, in the projector in this embodiment, in case of displaying the OSD screen when the lamp power is reduced by the adjustment control of the lam power, the OSD screen is changed into the screen pattern for dark screens.in order to prevent the lamp power from becoming large making the lamp brighter. In this case, in displaying the screen pattern for dark screens, the visibility of the OSD screen gets degraded in case of making the whole screen dark colors. To cope with this issue, contrast between the background and the parts such as texts and cursors is maintained high more than the predetermined value. Consequently, it is possible to maintain the energy-saving effect in adjusting and controlling the lamp power and project the OSD screen maintaining its visibility.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (AMC) and conventional circuit components arranged to perform the recited functions.

What is claimed is:

1. A projector, comprising:
    a light source;
    a light source output adjustment unit configured to control output of the light source according to brightness of a video signal input to the projector; and
    a superimposed image projection unit configured to superimpose a superimposed image on a projection image to generate multiple different superimposed images indicating same content but whose character fonts or character sizes are different from each other, select one of the different superimposed images based on the brightness of the video signal and a threshold brightness value, and project the selected one of the different superimposed images, the projection image being generated according to the video signal.

2. The projector according to claim 1, wherein the superimposed image projection unit is configured to project one of the different superimposed images depending on output of the light source as controlled by the light source output adjustment unit.

3. The projector according to claim 1, wherein the superimposed image projection unit is configured to generate the different superimposed image as a first image pattern and a second image pattern different from the first pattern,
    wherein the superimposed image projection unit is configured to select the second image pattern if the brightness of the video signal is equal to or less than the threshold brightness value.

4. The projector according to claim 3, wherein the second image pattern has a darker background and greater contrast between background and text than the first image pattern.

5. A projector, comprising:
    a light source;
    a light source output adjustment unit configured to control output of the light source according to brightness of a video signal input to the projector; and
    a superimposed image projection unit configured to superimpose a superimposed image on a projection image to generate multiple different superimposed images indicating same content but whose character fonts or character sizes are different from each other, select one of the different superposed images based on the brightness of the video signal and a threshold brightness value, and project the selected one of the different superimposed images, the projection image being generated according to the video signal,
    wherein the superimposed image projection unit is configured to project the selected one of the different superimposed images depending on output of the light source as controlled by the light source output adjustment unit, and
    wherein background of each string in the first image pattern has alternating bands of different brightness, and background of the second image pattern has uniform brightness.

6. A method of controlling a projection image, comprising:
controlling output of a projector light source according to brightness of a video signal;
superimposing a superimposed image on a projection image to generate multiple different superimposed images indicating same content but whose character fonts or character sizes are different from each other, the projection image being generated according to the video signal;
selecting one of the different superimposed images based on the brightness of the video signal and a threshold brightness value; and
projecting the selected one of the different superimposed images.

7. A non-transitory, computer-readable recording medium storing a program that, when executed by a projector, causes the projector to implement a method of controlling the projector, the method comprising:
controlling output of a projector light source according to brightness of a video signal; and
superimposing a superimposed image on a projection image to generate multiple different superimposed images indicating same content but whose character fonts or character sizes are different from each other, the projection image being generated according to the video signal;
selecting one of the different superimposed images based on the brightness of the video signal and a threshold brightness value; and
projecting the selected one of the different superimposed images.

8. The projector according to claim 1, wherein the superimposed image projection unit is configured to store the multiple different superimposed images in a memory, and the superimposed image projection unit is configured to select one of the stored different superimposed images based on the brightness of the video signal and the threshold brightness value.

9. The projector according to claim 1, wherein the superimposed image projection unit is configured to determine the brightness of the video signal based on at least one of a number of gradations of brightness and RGB values of the video signal.

10. The projector according to claim 1, wherein the different superimposed images have different brightnesses from each other.

11. The projector according to claim 1, wherein the different superimposed images relate to a menu for adjusting settings of the projector.

* * * * *